United States Patent [19] [11] 4,415,248
Suzuki et al. [45] Nov. 15, 1983

[54] EXPOSURE CONTROL APPARATUS

[75] Inventors: Ryoichi Suzuki, Kawasaki; Takashi Uchiyama, Yokohama, both of Japan

[73] Assignee: Canon Kabushiki Kaisha, Tokyo, Japan

[21] Appl. No.: 386,766

[22] Filed: Jun. 9, 1982

Related U.S. Application Data

[63] Continuation of Ser. No. 231,782, Feb. 5, 1981.

[30] Foreign Application Priority Data

Feb. 8, 1980 [JP]  Japan ................................. 55-15090

[51] Int. Cl.$^3$ ............................................. G03B 7/08
[52] U.S. Cl. ....................................... 354/43; 354/59; 354/227
[58] Field of Search ........................... 354/227, 59, 43

[56] References Cited

U.S. PATENT DOCUMENTS

| 3,555,987 | 1/1971 | Browning | 354/227 |
| 4,054,890 | 10/1977 | Shimomura | 354/227 |
| 4,065,777 | 12/1977 | Maitani et al. | 354/59 |
| 4,190,343 | 2/1980 | Wagensonner | 354/227 |
| 4,251,141 | 2/1981 | Stemme et al. | 354/227 |
| 4,313,663 | 2/1982 | Stemme et al. | 354/227 |

Primary Examiner—Russell E. Adams
Attorney, Agent, or Firm—Toren, McGeady and Stanger

[57] ABSTRACT

An exposure control apparatus including an electrically operated optical diaphragm. The apparatus is provided with means for detecting a quantity of light coming from an object to be photographed during an exposure control cycle thereof. The detecting means is connected to the electrically operated optical diaphragm device in accordance with an output signal of the detecting means during the exposure control cycle.

9 Claims, 3 Drawing Figures

EXPOSURE CONTROL APPARATUS

This is a continuation of application Ser. No. 231,782, filed Feb. 5, 1981.

BACKGROUND OF THE INVENTION

1. Field of the Invention

This invention relates to an exposure control apparatus using an electrically operated optical diaphragm as diaphragm device.

2. Description of the Prior Art

The conventional camera has been using a mechanical diaphragm as its diaphragm device. However, since a mechanical diaphragm device necessitates the use of a complex mechanical mechanism, reduction in size of the camera has been hindered and design latitude has been prevented. Hence there have been proposed various inexpensive, small electrically operated optical diaphragms such as those composed of a Kerr cell, a transparent ferroelectric substance (hereinafter will be called PLZT for short), liquid crystal, an electrochromie element, a Faraday element or an element utilizing electrophoresis. However, with the camera using such an electrically operated optical diaphragm of the prior art, an aperture value thereof remains unchanged once the value is determined. Therefore, when the brightness of an object to be photographed changes, for example, during a shutter release operation or during a cycle of an exposure control operation after determination of an aperture value, such a camera is bound to have an inappropriate exposure value.

SUMMARY OF THE INVENTION

It is an object of the present invention to provide an exposure control apparatus using an electrically operated optical diaphragm which is capable of giving an appropriate exposure value even when the brightness of an object to be photographed changes during the above stated operation.

Another object of the invention is to provide an exposure control apparatus using an electrically operated optical diaphragm which is capable of giving an appropriate exposure value even if the brightness of the object becomes higher or lower after determination of an aperture value.

A further object of the invention is to provide an exposure control apparatus using an electrically operated optical diaphragm which is not only capable of attaining the above stated objects but also operates with a high degree of precision.

Still a further object of the invention is to provide an exposure control apparatus using an electrically operated optical diaphragm which is capable of attaining the above stated objects even where the brightness of an object to be photographed is arranged to be once memorized.

These and further objects and features of the invention will become apparent from the following description of embodiments thereof taken in connection with the accompanying drawings.

DETAILED DESCRIPTION OF PREFERRED EMBODIMENTS

Figure 1:
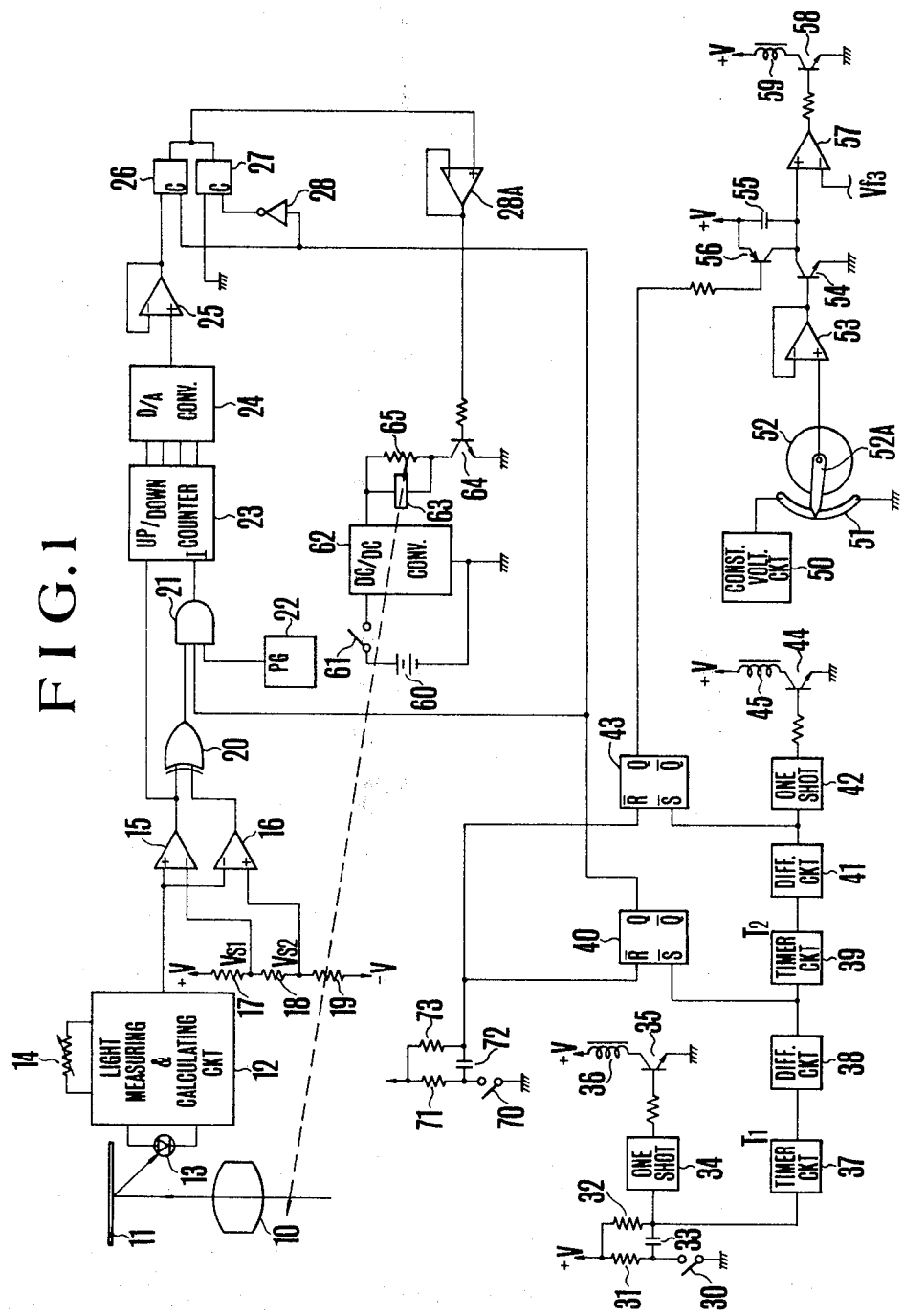
FIG. 1 is a block diagram showing a camera as an embodiment of the invention.

What is represented by the block diagram in FIG. 1 as an embodiment of the invention is a single-lens reflex camera of a shutter speed priority, automatic exposure control type (hereinafter will be called a shutter speed priority AE camera). Referring to FIG. 1, there are provided a photograph taking lens 10; a film 11; a known light measuring and calculating circuit 12; a light receiving or light sensitive element 13 (SPC) disposed in a position to receive a reflection light from the film 11; and a variable resistor 14 for obtaining information on the ASA sensitivity value of the film in use, a preset shutter speed value and compensation for curvature of the lens. When an electrically operated optical diaphragm disposed within the optical system of the lens 10 is stopped down to an appropriate degree, the level of the voltage at the light measuring and calculating circuit 12 becomes zero.

When the diaphragm is stopped down to an insufficient degree or to an excessive degree, the light measuring and calculating circuit 12 produces a voltage of a plus or minus level. A comparator is formed by operational amplifiers (hereinafter an operational amplifier will be called an OP amplifier for short) 15 and 16. The non-inversion input terminal of the OP amplifier 15 and the inversion input terminal of the OP amplifier 16 are connected to the output terminal of the above stated light measuring and calculating circuit 12. There are provided voltage dividing resistors 17, 18 and 19. The voltage dividing point VS1 of the voltage dividing resistors 17 and 18 and the voltage dividing point VS2 of the voltage dividing resistors 18 and 19 are respectively connected to the inversion input terminal of the OP amplifier 15 and the non-inversion input terminal of the OP amplifier 16. A reference numeral 20 indicates an exclusive OR gate. The two input terminals of the exclusive OR gate 20 is connected to the output terminals of the OP amplifiers 15 and 16. A numeral 21 indicates an AND gate having three inputs. One input terminal of the AND gate 21 is connected to the output terminal of the exclusive OR gate 20.

A numeral 22 indicates a pulse generating circuit which produces a pulse train of frequency of several tens or several hundred MHz in a repeating manner. The output of the pulse generating circuit 22 is supplied to one of the input terminals of the above stated AND gate 21. An up-down counter 23 has the output of the AND gate 21 supplied as input thereto and the output of the above stated OP amplifier 15 supplied to the up-down terminal thereof. A numeral 24 indicates a digital-to-analog converter (hereinafter will be called D-A converter) which receives a binary coded signal of four bits and converts it into an analog signal. The output terminal of the D-A converter 24 is connected to an OP amplifier 25 which forms a voltage follower. Numerals 26 and 27 indicate analog switches. The input terminal of the analog switch 26 is connected to the output terminal of the above stated OP amplifier 25 while the input terminal of the analog switch 27 is arranged to receive a voltage of ground level. There is provided a switch 30 which is responsive to a shutter release operation. A differentiation circuit is formed by resistors 31 and 32 and a capacitor 33. The output terminal of this differentiation circuit is connected to a one-shot multivibrator 34 which has a switching transistor 35 connected through a resistor to the output terminal thereof. The switching transistor 35 has an electromagnet 36 for releasing a first locking member connected to the collector thereof. A timer circuit 37 is connected to the output terminal of the above stated differentiation circuit 31–33. Another differentiation circuit 38 is connected to the output terminal of the timer circuit 37. When the output of the timer circuit 37 changes from a high level to a low level, the differentiation circuit 38 produces negative differentiation pulses. The differentiation circuit 38 has an RS flip-flop circuit 40 and a timer circuit 39 connected to the output terminal thereof. A differentiation circuit 41 is connected to the output terminal of the timer circuit 39. The differentiation circuit 41 produces differentiation pulses when the output of the timer circuit 39 changes to a low level. A one-shot multivibrator 42 and an RS flip-flop circuit are connected to the output terminal of the differentiation circuit 41. A switching transistor 44 is connected to the output terminal of the one-shot multivibrator 42 through a resistor. An electromagnet 45 which is provided for the purpose of releasing a leading shutter curtain locking member is connected to the collector of the switching transistor 44.

A block 50 represents a constant voltage producing circuit. A resistor 51 is connected to the output terminal of the constant voltage circuit 50. There is provided a presetting shutter dial 52 having a conductive pointer 52A which is arranged to slide on the above stated resistor 51 according as the shutter dial 52 rotates. A voltage follower is formed by an OP amplifier 53. The output terminal of the OP amplifier 53 is connected to a transistor 54 which is provided for logarithmic expansion. There are further provided a capacitor 55 for time determining arrangement; a count starting switching transistor 56 which is connected in parallel with the time determining capacitor 55 with the base thereof connected to the Q output terminal of the above stated RS flip-flop circuit 43 through a resistor; and an OP amplifier 57 which forms a comparator. The non-inversion input terminal of the OP amplifier 57 is connected to the collector of the above stated transistor 54 while the inversion input terminal of the OP amplifier 57 has a reference voltage Vf3 impressed thereon. The output terminal of the OP amplifier 57 has the base of a switching transistor 58 connected thereto through a resistor. Meanwhile, an electromagnet 59 which is provided for the purpose of unlocking the trailing curtain of the shutter is connected to the collector of the switching transistor 58.

A numeral 60 indicates a power source battery; 61 indicates a main switch; 62 indicates a DC-to-DC converter which is arranged to boost an input DC voltage up to a high DC voltage of several hundred volt and to produce it as output; 64 indicates a transistor which has its base connected through a resistor and an OP amplifier 28A to the output terminals of the above stated analog switches 26 and 27 and its collector to a resistor 65; 63 indicates an electrically operated optical diaphragm using a PLZT which is connected in parallel with the resistor 65, the diaphragm being disposed within the photograph taking optical system 10; 70 indicates a switch which closes upon completion of a travel made by the trailing curtain of the shutter; and 71, 72 and 73 indicate resistors and a capacitor forming a differentiation circuit. The output of the differentiation circuit is arranged to be supplied to the reset terminals of the above stated RS flip-flop circuits 40 and 43.

The Q output of the RS flip-flop circuit 40 is arranged to be supplied to one of the input terminals of the above stated AND gate 21 and to the control terminal of the analog switch 26. An inverter circuit 28 is connected to the Q output terminal of the RS flip-flop circuit 40. The output of the inverter circuit 28 is supplied to the control terminal of the analog switch 27. The camera which is arranged as described in the foregoing operates in the following manner:

When a shutter release operation is performed, the switch 30 closes. The differentiation circuit 31, 32 and 33 produces negative differentiation pulses to trigger the one-shot multivibrator 34. The level of the output of the multivibrator 34 becomes high and the high level output remains for a predetermined period of time. During this period, the switching transistor 35 is turned on to effect a power supply to the first unlocking electromagnet 36. Then, a quick return mirror which is not shown begins an upward movement thereof. Meanwhile, the negative differentiation pulses produced by the differentiation circuit 31, 32 and 33 also triggers the timer circuit 37 to retain the output of the timer circuit at a high level for a period of time T1. The time T1 is set at a length of time required until the upward movement of the quick return mirror is completed and the mirror becomes stable. When the output of the timer circuit 37 changes from the high level to a low level, the differentiation circuit 38 which is disposed at the next stage produces negative differentiation pulses to set thereby the RS flip-flop circuit 40. This causes the Q output of the flip-flop circuit 40 to change to a high level.

With the mirror in the uplifted state, if the diaphragm is in a full open state, the quantity of light incident upon the shutter curtain disposed in front of the film 11 is excessive for making an adequate exposure. Therefore, the output of the light measuring and calculating circuit 12 changes to a plus level. If the level is higher than the voltage of the point VS1, the level of the output of the OP amplifier 15 becomes high while the level of the output of the OP amplifier 16 becomes low. Then, the level of the output of the exclusive OR gate 20 becomes high.

Therefore, after the lapse of time T1 after the shutter release operation, when the level of the Q output of the RS flip-flop circuit 40 becomes high, a high speed pulse train of the pulse generating circuit 22 is produced from the output terminal of the AND gate 21. Since the up-down terminal of the up-down counter 23 is at a high level, the up-down counter 23 up-counts the input pulse train. The result of the count is converted into an analog voltage at the D-A converter which is disposed at the next stage. The analog voltage thus obtained is produced from the output terminal of the voltage follower 25. Since the Q output of the RS flip-flop circuit 40 is at a high level, the output of the inverter circuit 28 is at a low level. Under this condition, the analog switch 26 is on and another switch 27 is off. The base current of the transistor 64, therefore, changes in proportion to the analog output voltage of the above stated D-A converter 24 while the collector current of the transistor is also proportional thereto. Accordingly, the collector voltage of the transistor 64 changes approximately in proportion to the above stated analog voltage. Then, the voltage of the resistor 65 which is connected in series with the collector is impressed on the PLZT 63 of the electrically operated optical diaphragm. Then, the light transmissivity of the PLZT which has a large impedance varies with the impressed voltage to perform a stopping down operation accordingly.

With this stopping-down operation performed, the quantity of light incident upon the surface of the shutter curtain comes to decrease. The level of the output of the light measuring and calculating circuit 12 begins to lower. When the stopped down degree of the electrically operated optical diaphragm reaches an appropriate value, the level of the output of the light measuring and calculating circuit 12 becomes a ground level. The reference voltage VS1 which is the voltage at the voltage dividing point VS1 of the voltage dividing circuit and the reference voltage VS2 which is the voltage at another voltage dividing point VS2 of the voltage dividing circuit are set in a relation to VS1 > ground level > VS2. Therefore, the levels of both the outputs of the OP amplifiers 15 and 16 become low. The level of the output of the exclusive OR gate 20 also becomes low. By this, the pulse train output of the AND gate 21 is blocked and the result of the count at the up-down counter 23 does not progress, so that the stopped down degree of the PLZT 63 can be kept at an adequate value.

After the shutter release operation, when the negative differentiation pulses are produced from the differentiation circuit 38 after the lapse of time T1, the timer circuit 39 is triggered thereby and the output of the timer circuit 39 is kept at a high level for a period of time T2. After that, when the output changes to a low level, the differentiation circuit 41 disposed at the next stage produces negative differentiation pulses, which trigger the one-shot multivibrator 42 disposed at the next stage. The output of the multivibrator 42 is then kept at a high level for a predetermined period. During this period, the switching transistor 44 is turned on to have a power supplied to the electromagnet for unlocking the leading curtain of the shutter. The leading shutter curtain then begins to travel.

Further, when differentiation pulses are produced from the output terminal of the above stated differentiation circuit 41, the RS flip-flop circuit 43 is set. The Q output of the flip-flop circuit 43 comes to a high level. The count starting switching transistor 56 is turned off. The time determining capacitor 55 then is charged with the collector current of the logarithmic expansion transistor 54. At this point of time, a voltage corresponding to the logarithm of preset shutter time is produced at the output terminal of the OP amplifier 53 which forms a voltage follower. Therefore, the transistor 54 has a collector current corresponding to the actual time of the preset shutter speed.

During the process of a shutter operation, if the brightness of an object to be photographed is increased suddenly for some reason, the quantity of light incident upon the surface of the film also suddenly increases. Accordingly, the output of the light measuring and calculating circuit 12 becomes a plus level. If this level becomes higher than the level of voltage VS1, the level of the output of the OP amplifier 15 becomes high and that of the output of the OP amplifier 16 becomes low. The output of the exclusive OR gate 20 becomes a high level to cause a high speed pulse train to be produced from the output terminal of the AND gate 21. Since the up-down terminal of the up-down counter 23 is then at a high level, the input pulse train is up counted by the counter 23. Therefore, the analog output voltage of the D-A converter increases. The collector current of the transistor 64 increases. The collector voltage of the transistor 64 decreases. The voltage impressed on the PLZT 63 increases. The light transmission quantity of the PLZT 63 decreases. The stopping down degree of the electrically operated optical diaphragm thus increases to keep the quantity of light incident upon the film surface unvaried.

Conversely, when the brightness of the object is suddenly lowered by some reason during the process of a shutter operation, the quantity of light incident upon the film surface also decreases. The output of the light measuring and calculating circuit 12 then becomes a minus level. If this level is lower than the level of voltage VS2, the level of the output of the OP amplifier 15 becomes low and that of the output of the OP amplifier 16 becomes high. The level of the output of the exclusive OR gate 20 becomes high and a high speed pulse train is produced from the output terminal of the AND gate 21. In this instance, the up-down terminal of the up-down counter is at a low level. The up-down counter 23, therefore, down-counts the input pulse train. The analog output voltage of the D-A converter 24 decreases. The base current and the collector current of the transistor 64 become lower. The voltage dropped at the resistor 65 also decreases and the impressed voltage on the PLZT 63 decreases. The transmission light quantity of the PLZT 63 increases. The stopping down degree of the electrically operated optical diaphragm is lessened to keep the quantity of light incident upon the film surface 11 unvaried.

In accordance with the embodiment of the invention described in the foregoing, the degree of stopping down is arranged to vary in such a way as to keep the quantity of light incident upon an imaging plane unchanged even when the brightness of an object to be photographed suddenly changes during the process of a shutter operation, so that an adequate exposure can be accomplished without fail.

When the charged level of the above stated time determining capacitor 55 reaches a predetermined value, the level of the non-inversion input of the OP amplifier 57 becomes lower than that of the inversion input thereof. The output of the OP amplifier 57 then changes to a low level to turn off the switching transistor 58. The power supply to the electromagnet 59 which is provided for control over the trailing curtain of the shutter is cut off to allow the trailing shutter curtain to begin its travel.

Upon completion of the travel of the trailing curtain of the shutter, the switch 70 is closed. The differentiation circuits 71, 72 and 73 then produce negative differentiation pulses. The RS flip-flop circuits 40 and 43 are reset by the pulses and their Q outputs change to a low level. Therefore, the AND gate 21 is closed to stop the pulse train from entering the up-down counter 23. Further, since the output of the inverter circuit 28 is at a high level, the analog switch is turned off while the other analog switch 27 is turned on to have a voltage of ground level impressed on the base of the transistor 64. The transistor 64 is thus turned off to nullify the impressed voltage on the PLZT 63 and the PLZT diaphragm 63 comes back to a full open state.

In this particular embodiment, the electrically operated optical diaphragm is arranged to begin a stopping down operation after completion of the mirror uplifting action. However, the invention is not limited to this arrangement and the stopping down operation of the diaphragm may be arranged to begin prior to completion of the mirror uplifting action.

Figure 2:
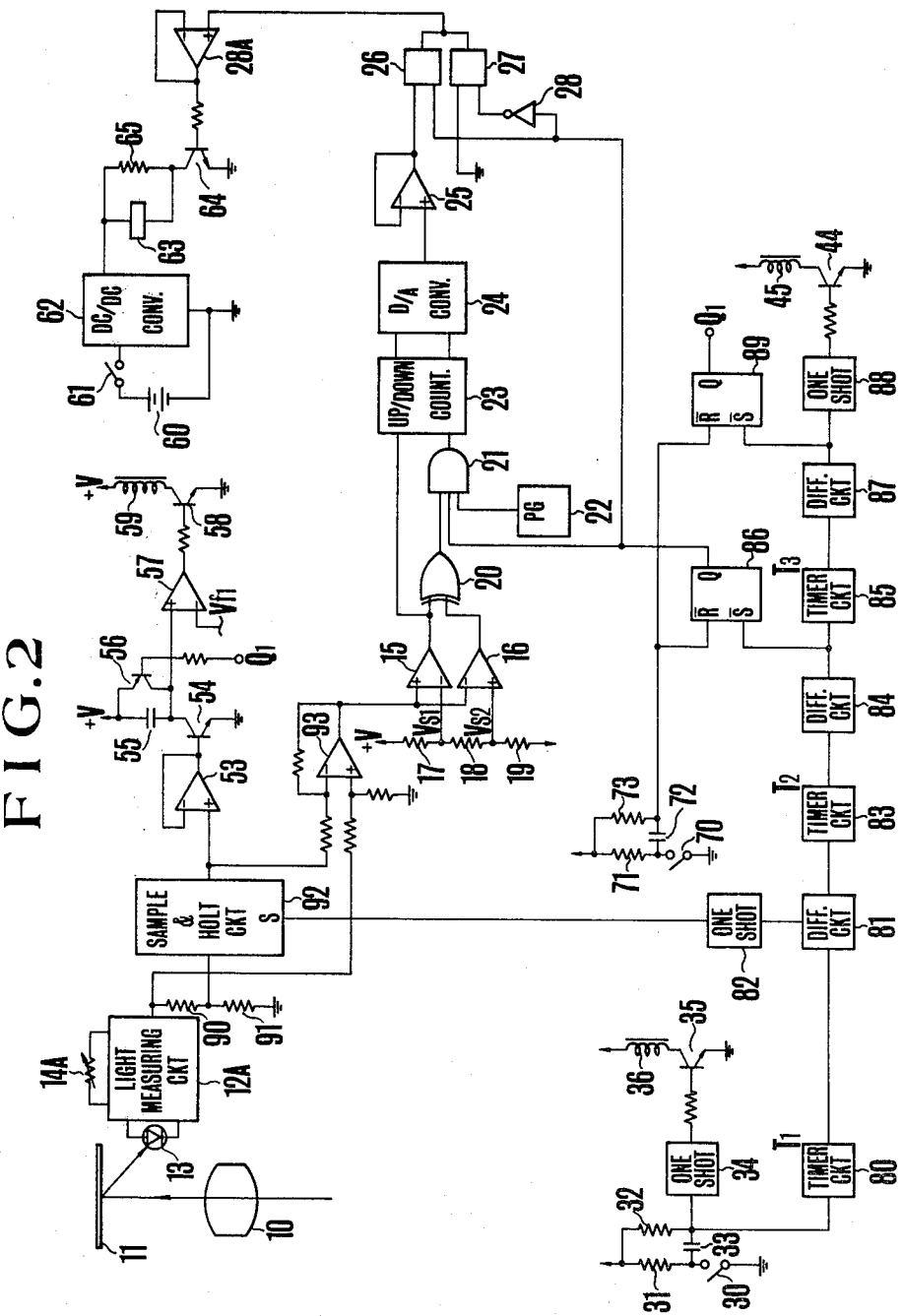
FIG. 2 is a block diagram of another embodiment of the invention.

A second embodiment of the invention is as shown in FIG. 2. In the second embodiment, the invention is applied to an automatic exposure, single-lens reflex camera of a programmed type. In FIG. 2, the parts and components indicated by the same reference numerals are arranged to perform the same functions as the corresponding parts and components shown in FIG. 1. Description of such parts and components is therefore omitted from the following description. There are provided a light measuring and calculating circuit 12A which is of a known type and a variable resistor 14A which is for obtaining information on the ASA sensitivity of the film to be used. Resistors 90 and 91 having the same resistance value are connected in series to the output terminal of the light measuring and calculating circuit 12A. A block 92 represents a sample and hold circuit which is of a known type and is formed, for example by a capacitor and an analog gate. A voltage dividing point between the above stated voltage dividing resistors 90 and 91 is connected to the input terminal of the sample and hold circuit 92. A block 80 indicates a timer circuit. The timer circuit 80 has the output terminal of a differentiation circuit 31, 32 and 33 connected to the input terminal thereof. The output terminal of the timer circuit 80 is connected to a differentiation circuit 81. The output terminal of the differentiation circuit 81 is connected to a one-shot multivibrator 82, the output of which is arranged to be supplied to the sample terminal of the above stated sample and hold circuit 92. A timer circuit 83 is connected to the output terminal of the differentiation circuit 81. The output terminal of the timer circuit 83 is connected to a differentiation circuit 84. The output of the differentiation circuit 84 is arranged to be supplied to the set terminal of an RS flip-flop circuit 86, which has the output terminal of a differentiation circuit 71, 72 and 73 connected to the reset terminal thereof. There is provided a switch 70 which closes when the trailing curtain of a shutter which is not shown completes its travel. A timer circuit 85 is connected to the output terminal of the above stated differentiation circuit 84 while the output terminal of the timer circuit 85 is connected to a differentiation circuit 87. A one-shot multivibrator 88 is connected to the output terminal of the differentiation circuit 87 while an RS flip-flop circuit 89 is connected also to the output terminal of the circuit 87. The Q output terminal Q1 of the RS flip-flop circuit 89 is connected through a resistor to the base of a switching transistor 56 provided for starting the count.

The output terminal of the above stated sample and hold circuit 92 is connected through a resistor to the inversion input terminal of an OP amplifier 93 which forms a differential amplifier. The non-inversion input terminal of the amplifier 93 has the output terminal of the above stated light measuring and calculating circuit 12A connected thereto through a resistor. The output of the OP amplifier 93 becomes a plus level when the stopping down degree of the electrically operated optical diaphragm 63 is insufficient; becomes a ground level when the stopping down degree is appropriate; and becomes a minus level when the stopping down degree is excessive. The embodiment which is shown in FIG. 2 and arranged as described in the foregoing operates in the following manner:

When the switch 30 closes in response to a shutter release operation, the differentiation circuit 31, 32 and 33 produces negative differentiation pulses. The pulses thus produced trigger the one-shot multivibrator 34 which is disposed at the next stage. Then, the output of the one-shot multivibrator 34 is kept at a high level for a predetermined period of time. During this period, the switching transistor 35 is turned on to supply a power to the electromagnet 36 which is provided for the purpose of releasing a first locking member. Then, a quick return mirror which is not shown begins to be raised. The timer circuit 80 is triggered also by the pulses produced from the above stated differentiation circuit 31, 32 and 33 and retains its output at a high level for a period of time T1. The time T1 is set at a span of time required for completion of the uplifting of the quick return mirror. When the output of the timer circuit 80 changes to a low level, the differentiation circuit 81 which is disposed at the next stage then produces negative differentiation pulses. The one-shot multivibrator 82 which is disposed at the next stage is triggered to produce one pulse from its output terminal. A measured value of light is arranged to be stored by this pulse.

Upon completion of uplifting of the mirror, the quantity of light incident upon the light receiving element 13 comes to correspond to $(BV-AVo)$. Therefore, the output voltage of the light measuring and calculating circuit 12A corresponds to $(BV-AVo+SV)$. Therefore, the stored output voltage of the sample and hold circuit 92 corresponds to $(BV-AVo+SV)/2=TV$.

Next, the timer 83 which is disposed at the next stage is triggered by the differentiation pulses coming from the above stated differentiation circuit and the output of the timer comes to a high level for a period of time T2. When the timer output changes to a low level, negative differentiation pulses are produced from the differentiation circuit 84 of the next stage. The RS flip-flop circuit 86 is set by the pulses. The Q output of the flip-flop circuit 86 changes to a high level to permit the output pulses of the pulse generating circuit 22 to enter the up-down counter 23.

As will be further described in detail below, in the embodiment shown in FIG. 2, servo control over the diaphragm is accomplished in such a manner that the output voltage value of the light measuring and calculating circuit 12A becomes equal to the stored voltage value of the sample and hold circuit 92, which corresponds to $(BV-AVo+SV)/2$.

In the case of a programmed automatic exposure control using a program line which has the shutter time and the diaphragm aperture value vary in the ratio of 1:1, a change in the brightness of the object by two steps causes the shutter time and the aperture to change by one step respectively. With such arrangement applied to a control operation where light is measured on the film surface through an actual aperture, when the brightness of the object BV changes by one step, it suffices that the aperture servo changes by half step for a change in the output of the calculating circuit 12A. Therefore, the output of the light measuring and calculating circuit 12A is reduced to a $\frac{1}{2}$ value by the voltage dividing circuit and the actual aperture value is changed in relation to this value through a servo circuit. With the actual aperture controlled in this manner, the value of the shutter time is controlled to a value changed by $\frac{1}{2}$ step from the value obtained when there is no change in the value BV.

In the second embodiment of the invention, the output voltage of the light measuring and calculating circuit 12A is reduced to a $\frac{1}{2}$ value at the voltage dividing circuit and the aperture servo control is accomplished to make this equal to the stored voltage value of the sample and hold circuit 92. By this arrangement, the shutter time is arranged to change by ½ step in response to the change of the actual aperture. This enables the use of the programmed automatic exposure control having the 1:1 program line. When the aperture of the electrically operated optical diaphragm 63 is stopped down to a value less than an appropriate value and the output voltage of the light measuring and calculating circuit 12A is higher than the output voltage of the sample and hold circuit 92, the output voltage of the OP amplifier 93 which forms a differential amplifier becomes a plus level; the output of the OP amplifier 15 disposed at the next stage comes to a high level while that of the OP amplifier 16 becomes a low level. Accordingly, the output of the exclusive OR gate 20 becomes a high level to have a high speed pulse train produced from the output terminal of the AND gate 21. The pulse train is supplied to the up-down counter 23 disposed at the next stage.

Since the output of the OP amplifier 15 is at a high level, the up-down counter 23 up-counts the input pulse train and the analog output voltage of the D-A converter increases. Since the Q output of the RS flip-flop circuit 86 is at a high level, the output of the inverter circuit 28 is at a low level. The analog switch 26 is turned on and another analog switch 27 is turned off. Therefore, the analog output voltage of the above stated A-D converter is produced through the voltage followers 25 and 28A. The base current of the transistor 64 increases in response to the analog output voltage. Then, the impressed voltage on the PLZT 63 increases to lower the transmissivity of the electrically operated optical diaphragm 63. When the stopping down degree of the electrically operated optical diaphragm 63 reaches an appropriate value, the output voltage of the light measuring and calculating circuit 12A becomes about equal to the output voltage of the sample and hold circuit 92. Then, the output voltage of the OP amplifier 93 which forms a differential amplifier comes to a level between VS1 and VS2. The levels of the OP amplifiers 15 and 16 become low. Therefore, the level of the output of the exclusive OR gate also becomes low to cut off the pulse train output from the AND gate 21. Therefore, the outputs of the up-down counter 23 and the D-A converter 24 are kept in an appropriate state and the stopping down operation comes to an end.

Further, the negative differentiation pulses produced from the differentiation circuit 84 come to set the timer 85 which is disposed at the next stage and the output of the timer is kept at a high level for a period of time T3. The time T3 is set at a span of time long enough to have the stopping down operation on the above stated electrically operated optical diaphragm 63 completed. When the output of the timer circuit 85 changes to a low level, the differentiation circuit 87 disposed at the next stage produces negative differentiation pulses. The pulses then trigger the one-shot multivibrator 88. The output of the multivibrator comes to a high level and so remains for a predetermined period. During this period, the switching transistor 44 is turned on to effect power supply to the electromagnet 45 for unlocking the leading curtain of the shutter. The leading shutter curtain then begins to travel.

The RS flip-flop circuit 89 is set by the negative differentiation pulses produced from the above stated differentiation circuit 87. The Q output Q1 of the flip-flop circuit 89 comes to a high level to turn off the switching transistor 56 provided for count starting. Then, the time constant capacitor 55 begins to be charged with a current corresponding to the logarithmic expansion value of the output voltage of the sample and hold circuit.

When a change takes place in the brightness of the object to be photographed during the shutter operation described in the foregoing, the servo control system which includes the up-down counter 23 works to change the stopped down degree of the electrically operated optical diaphragm 63 in the same manner as in the first embodiment to give a constant image surface illumination on the film surface 11.

When the quantity of the electric charge at the time determining capacitor 55 reaches a predetermined value, the level of the output of the OP amplifier 57 becomes low to turn off the switching transistor 58. The power supply to the electromagnet 59 which is provided for the purpose of unlocking the trailing curtain of the shutter is cut off. The trailing shutter curtain then begins to travel and an exposure effecting action comes to an end.

Upon completion of the travel of the trailing shutter curtain, the switch 70 is closed. The differentiation circuit 71, 72 and 73 produces negative differentiation pulses to reset the RS flip-flop circuits 86 and 89. The analog switch 26 is turned off while the analog switch 27 is turned on. This turns the transistor 64 on to nullify the impressed voltage on the PLZT 63 and the electrically operated optical diaphragm is brought into a full open state.

While the program line chart of this embodiment has a straight line slanting 45 degrees, the invention is not limited to such and the use of other program line charts are possible with some suitable design modification to the electric circuit.

Figure 3:
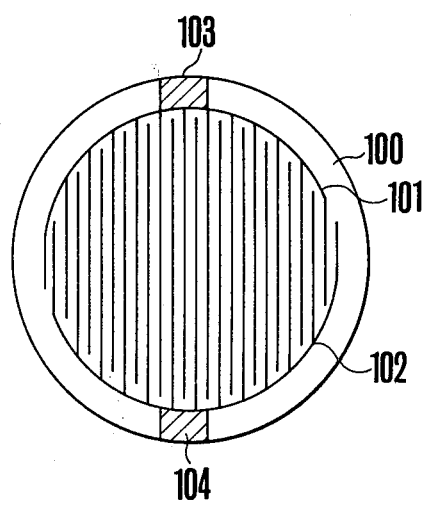
FIG. 3 is an illustration of the structure of an electrically operated optical diaphragm employed in the cameras shown in FIGS. 1 and 2.

The structural arrangement of the electrically operated optical diaphragm employed in the first and second embodiments described in the foregoing is as shown in FIG. 3.

In FIG. 3, a reference numeral 100 indicates a PLZT base plate; 101 and 102 indicate comb-shaped transparent electrodes formed on the PLZT base plate 100; and 103 and 104 indicate the terminals of these comb-shaped electrodes connecting them to a driving circuit disposed outside. The PLZT base plate 100 is interposed in between two polarizer plates and is suitably positioned within the photograph taking optical system 10 of the camera.

When a DC voltage is impressed between the comb-shaped electrodes 101 and 102, the plane of polarization of light passing through the PLZT base plate 100 is turned. The turning angle increases according as the impressed DC voltage increases. The quantity of light passing through the electrically operated optical diaphragm thus decreases according as the impressed DC voltage increases to have the diaphragm aperture stopped down.

While a transparent ceramic PLZT is employed as the electrically operated optical diaphragm in the embodiments described in the foregoing, it is to be understood that any electrically operated optical diaphragm element that has quick responsivity is usable in place of the PLZT in accordance with the invention. Further, the electrically operated optical diaphragm does not have to be of the transmissivity changing type but an area control type is also usable.

In accordance with the present invention, as described in detail in the foregoing, the electrically operated optical diaphragm is employed as a diaphragm device and is arranged to have the aperture thereof variable in close pursuit of any change that might take place in the brightness of an object to be photographed or the like during a light measuring process. Therefore, an appropriate exposure can be accomplished even when a sudden change takes place in the brightness during a shutter release operation or during an exposure control operation. What is claimed is:

1. An exposure control apparatus for a photographic camera having a shutter and an electrically operated optical diaphragm arranged to have the aperture thereof controlled, said apparatus comprising:

light measuring means which is arranged to produce, during each exposure control cycle of the camera, an electrical signal corresponding to the brightness of an object to be photographed and instantaneously varying in accordance with the variations of the brightness of the object to be photographed during each exposure control cycle of the camera; and control means coupled to the light measuring means and to said electrically operated optical diaphragm, said control means arranged to instantaneously make the aperture smaller when a light level of an object becomes brighter during an exposure control cycle of the camera and to instantaneously make the aperture larger when the light level becomes darker.

2. An exposure control apparatus according to claim 1, wherein said electrically operated optical diaphragm is formed with transparent ceramic.

3. An exposure control apparatus according to claim 2, wherein said control means includes means for supplying said transparent ceramic with a voltage of a level corresponding to the electrical signal from the light measuring means for the purpose of varying the light transmissivity of the transparent ceramic.

4. An exposure control apparatus for an automatic exposure control camera with a shutter speed priority having a shutter and an electrically operated optical diaphragm arranged to have the aperture thereof controlled, said apparatus comprising:

light measuring means which is arranged to produce, during each exposure control cycle of the camera, an electrical signal corresponding to the brightness of an object to be photographed, said electrical signal instantaneously varying in accordance with the variations of the brightness of the object to be photographed during each exposure cycle of the camera; and control means coupled to the light measuring means and to said electrically operated optical diaphragm, said control means being arranged to make the aperture of the electrically operated optical diaphragm instantaneously smaller when a light level of the object becomes brighter during an exposure cycle of the camera and to make the aperture instantaneously larger when the light level becomes darker.

5. An exposure control apparatus according to claim 4, wherein said electrically operated optical diaphragm is formed with transparent ceramic.

6. An exposure control apparatus according to claim 5, wherein said control means includes means for supplying said transparent ceramic with a voltage of a level corresponding to the electrical signal from the light emitting means for the purpose of varying the light transmissivity of the transparent ceramic.

7. An exposure control apparatus for a programmed type camera having a shutter and an electrically operated optical diaphragm arranged to have the aperture thereof controlled, said apparatus comprising:

light measuring means which is arranged to produce, during each exposure control cycle of the camera, an electrical signal corresponding to the brightness of an object to be photographed, said electrical signal instantaneously varying in accordance with the variations of the brightness of the object to be photographed during each exposure cycle of the camera; and control means coupled to the light measuring means and to said electrically operated optical diaphragm, said control means being arrayed to make the aperture of said electrically operated optical diaphragm instantaneously smaller when a light level of the object becomes darker during an exposure control cycle of the camera, and to make the aperture larger instantaneously when the light level becomes darker.

8. An exposure control apparatus for an automatic control type exposure camera with a shutter speed priority having a shutter and an electrically operated optical diaphragm arranged to have the aperture thereof controlled, said apparatus comprising:

light measuring means which produces, during each exposure control cycle of the camera, and electrical signal corresponding to the quantity of light which comes from an object to be photographed and passes through said electrically operated diaphragm, said electrical signal instantaneously varying in accordance with the variations of brightness of the object to be photographed during each exposure control cycle of the camera; and control means coupled to the light measuring means and to said electrically operated optical diaphragm, said control means being arranged to make the aperture of said electrically operated optical diaphragm instantaneously smaller when a light level of the object becomes brighter during an exposure cycle of the camera and to make the aperture instantaneously larger when the light level becomes darker.

9. An exposure control apparatus for a photographic camera having a shutter and an electrically operated optical diaphragm arranged to have the aperture thereof controlled, said apparatus comprising:

light measuring means which is arranged to receive, during each exposure control cycle of the camera, a reflected light from the film to be exposed and to produce instantaneously an electrical signal corresponding to the brightness of an object to be photographed, said electrical signal instantaneously varying in accordance with the variations of brightness of the object to be photographed during each exposure control cycle of the camera; and control means coupled to the light measuring means and to said electrically operated optical diaphragm, said control means being arranged to make the aperture of said electrically operated optical diaphragm instantaneously smaller when a light level of the object becomes brighter during an exposure control cycle of the camera and to make the aperture instantaneously larger when the light level becomes darker.

* * * * *